L. J. ULMER.
HEAT INSULATED RECEPTACLE.
APPLICATION FILED NOV. 11, 1910.
1,004,604.
Patented Oct. 3, 1911.
2 SHEETS—SHEET 2.
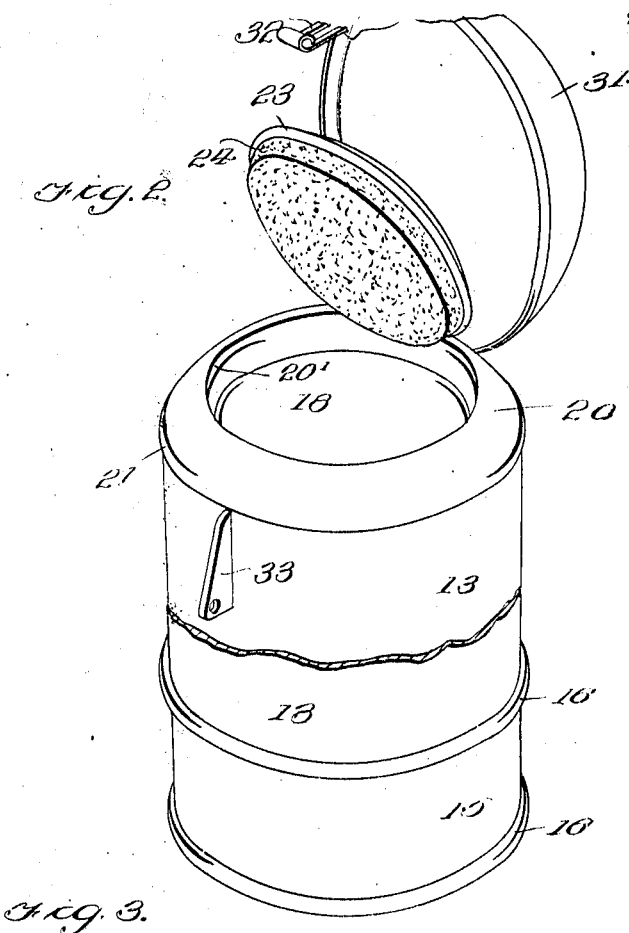
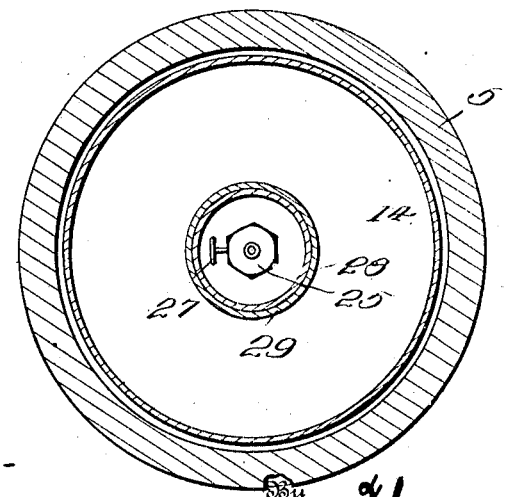

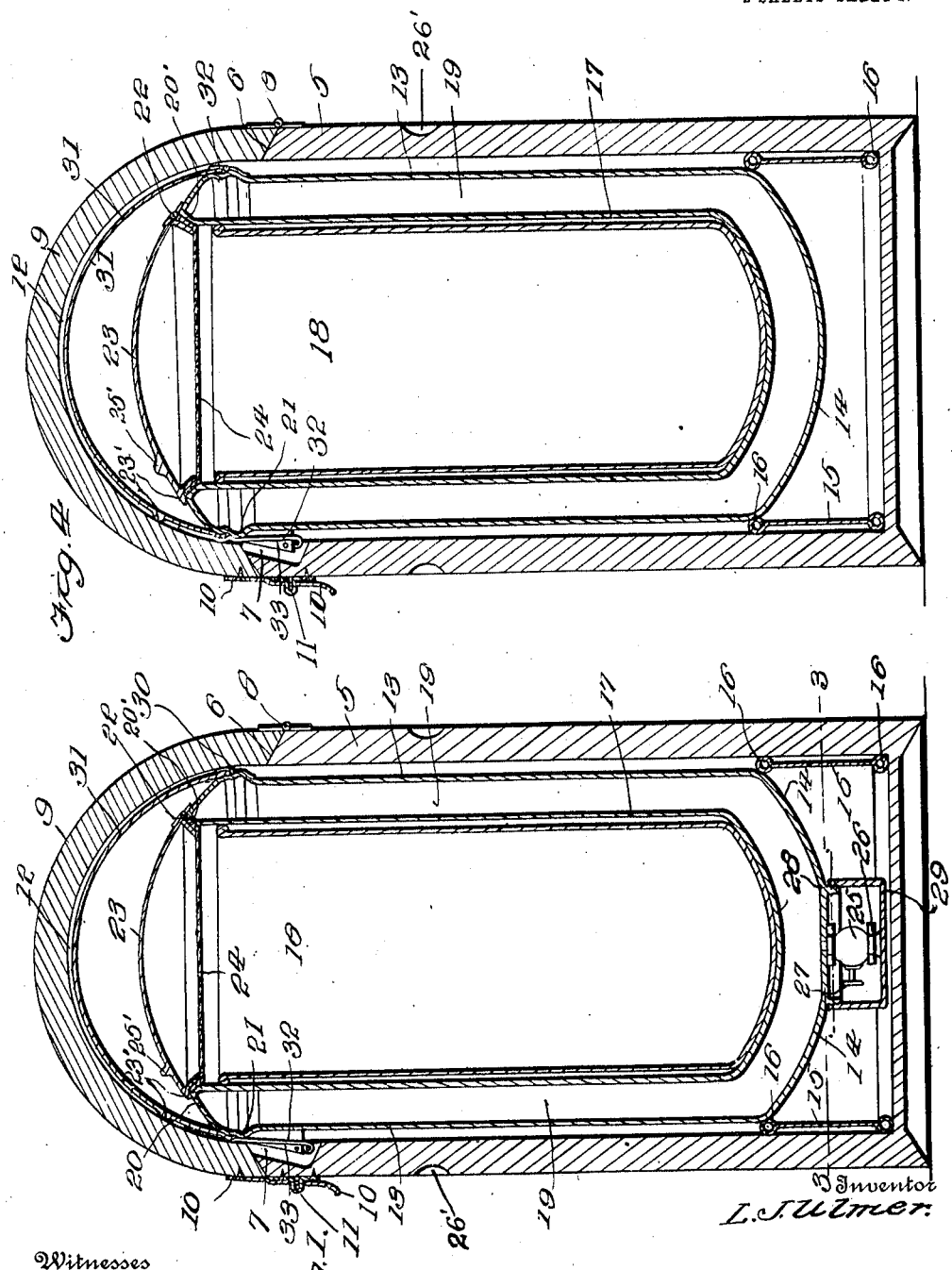

UNITED STATES PATENT OFFICE.

LESLIE J. ULMER, OF TERRE HAUTE, INDIANA.

HEAT-INSULATED RECEPTACLE.

1,004,604.

Specification of Letters Patent.

Patented Oct. 3, 1911.

Application filed November 11, 1910. Serial No. 591,920.

*To all whom it may concern:*

Be it known that I, LESLIE J. ULMER, citizen of the United States, residing at Terre Haute, in the county of Vigo and State of Indiana, have invented certain new and useful Improvements in Heat-Insulated Receptacles, of which the following is a specification.

This invention relates to heat insulated receptacles and has for its object the provision of a comparatively simple and thoroughly efficient device of this character, the construction of which is such that ice cream and like bodies may be retained in a frozen state for an indefinite period without the employment of ice or other refrigerant.

A further object is to provide a heat insulated receptacle including an outer casing, and a double walled receptacle fitting within said casing and adapted to receive an ice cream can or similar container.

A further object is to provide the double walled receptacle with a vacuum chamber having a nipple communicating therewith for attachment to a vacuum pump.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a vertical sectional view of a heat insulated receptacle or cabinet constructed in accordance with my invention; Fig. 2 is a detail perspective view of the inner double walled receptacle detached; Fig. 3 is a transverse sectional view taken on the line 3—3 of Fig. 1; Fig. 4 is a vertical sectional view illustrating a modified form of the invention.

Corresponding and like parts are referred to in the following description and indicated in all the views of the drawings by the same reference characters.

The improved heat insulated receptacle forming the subject matter of the present invention comprises an outer casing or cabinet 5 formed of wood or other suitable material and having its upper edge inclined or beveled at 6 and its wall at the front of the cabinet provided with a seating recess 7 for the purpose hereinafter referred to.

Pivotally mounted at 8, is a lid or cover 9 having its upper portion curved and its free end provided with a depending hasp 10 adapted to engage a keeper or similar fastening device 11 secured to the wall of the casing adjacent the recess 7. The lid 9 is hollow, as indicated at 12, the lower edge of said lid being inclined or beveled to conform to and adapted to bear against the beveled edge 6 of the casing, thus to form an air tight joint between the parts when the lid is in closed position.

Arranged within the casing 5, is a double walled receptacle 13, preferably constructed of metal and having a downwardly curved bottom 14. Depending from the lower portion of the receptacle 13 and secured in any suitable manner to the exterior wall thereof, is a circumferential bottom or extension 15, the lower edge of which extends below the bottom of said double walled receptacle and is adapted to rest on the bottom of the outer casing 5, the metal forming the upper and lower edges of the extension 15 being bent or pressed to produce spaced reinforcing beads 16.

Arranged within the double walled receptacle 13, is an ice cream can or similar container, indicated at 18, the inner and outer walls of the receptacle 13 at the sides and bottom thereof being spaced apart to form an annular vacuum chamber 19 surrounding said container, as shown. The upper end of the receptacle 13 is provided with a curved top 20 which forms a closure for the upper portion of the vacuum chamber 19, there being a circumferential rib or shoulder 21 formed on the exterior of said receptacle at the base of the top 20. Pivotally mounted at 22 on the top 20, is a cover 23, the lower face of which is provided with a strip of cork or felt 24 adapted to bear against an inclined shoulder 20′ on the top 20 so as to prevent the entrance of air to the cream can, the circumferential edge of the yieldable cork strip 24 being preferably inclined or beveled to conform to the inclination of the shoulder, as shown.

Depending from the bottom of the double walled receptacle 13, is a valve 25 having one end thereof communicating with the vacuum chamber 19 and its other end provided with a nipple 26 for attachment to a vacuum pump, said valve being provided with a finger piece 27, by means of which the valve may be opened and closed. Surrounding the valve 25, is a depending flange 28, the exterior wall of which is threaded for detachable engagement with a cap or cover 29, which latter forms a housing for the valve, as shown.

Pivotally mounted at 30 on the receptacle 13 is a lid or cover 31 which fits over the lid 23 and bears against the shoulder 21, said lid 31 being provided with a depending hasp 32 adapted to engage a catch or keeper 33. The catch or keeper 33 is provided with a transverse opening to permit the passage of a padlock or other suitable locking device.

It will here be noted that when the double walled receptacle 13 is placed in the outer casing 5, the catch or keeper 33 will enter the seating recess 7 and thus serve to center said receptacle within the outer casing and prevent movement of one relative to the other. It will also be noted that the hinge 8 of the outer casing is disposed below the shoulder 21 of the double walled receptacle so that when the lid 9 of said casing is moved to open position, a person may readily grasp the shoulder 21 and lift the double walled receptacle out of the casing.

In operation, the cap 29 is removed and the flexible hose of a vacuum pump attached to the nipple 26 so that by opening the valve 25 and operating the pump, air may be exhausted from the chamber 19. The cam 18 containing the ice cream or other material is then inserted within the double walled receptacle 13 and the covers 23 and 31 swung downwardly to closed position, after which said double walled receptacle, together with the ice cream can or container, is placed in the outer casing, the hollow cover of the casing serving to receive and house the cover 31 of the double walled receptacle, thus effectually to prevent the entrance of air to the ice cream and retain the latter in a frozen state for an indefinite period. The cover 23 is preferably formed with a laterally extending flange 23' which overlaps and bears against the top 20. Suitable handles 25' are also preferably secured to the covers 23 and 31, while the exterior wall of the casing 5 is formed with depressions constituting hand grips 26'.

In Fig. 4 of the drawings, there is illustrated a modified form of the invention in which the valve 25 and cap 29 are dispensed with, the vacuum being produced in any suitable manner, as by forming a small perforation in the double walled receptacle 13, applying a vacuum pump thereto, and subsequently filling said opening, the construction and operation of this form of the device being otherwise the same as that shown in Fig. 1 of the drawings.

It will of course be understood that the inner cover 23 of both forms of heat insulated receptacle or cabinet may be provided with a vacuum chamber if found desirable or necessary. It will also be understood that the receptacles may be made in different sizes and shapes, and that the double walled receptacle 13 may be nickeled, plated, coated or otherwise treated, without departing from the spirit of the invention.

Having thus described the invention, what is claimed as new is:

1. A device of the class described including an outer casing having a seating recess formed in one wall thereof and provided with a cover, a double walled receptacle fitting within the casing and adapted to receive a container, the inner and outer walls of the receptacle being spaced apart to form an annular vacuum chamber, a keeper secured to the exterior wall of the receptacle and adapted to fit within the seating recess of the casing, a cover for the double-walled receptacle and a fastening device carried by the cover of the double-walled receptacle and adapted to engage said keeper.

2. A device of the class described including an outer casing having a seating recess formed in one wall thereof, a cover forming a closure for the top of the casing, a double walled receptacle fitting within the casing and adapted to receive a container, the inner and outer walls of the receptacle being spaced apart to form an annular vacuum chamber, means for exhausting the air between the walls of the receptacle, a cover forming a closure for the upper end of the container, a keeper secured to the exterior of the double walled receptacle and adapted to fit within the seating recess of the casing, a cover pivotally mounted on the double walled receptacle and fitting within the cover of the casing, and a hasp secured to the cover of the double walled receptacle and adapted to engage the keeper.

In testimony whereof, I affix my signature in presence of two witnesses.

LESLIE J. ULMER. [L. S.]

Witnesses:
FRED C. WILTON,
ERNEST W. COLLISTER.